(12) United States Patent
Muranaka (10) Patent No.: US 6,934,374 B2
(45) Date of Patent: Aug. 23, 2005

(54) SYSTEM AND METHOD FOR DATA COMMUNICATION (75) Inventor: Tsuneyoshi Muranaka, Hadano (JP)

(73) Assignee: Ricoh Company, Ltd., Tokyo (JP)

( * ) Notice: Subject to any disclaimer, the term of this patent is extended or adjusted under 35 U.S.C. 154(b) by 909 days.

(21) Appl. No.: 09/941,610

(22) Filed: Aug. 30, 2001

(65) Prior Publication Data

US 2002/0051526 A1 May 2, 2002

(30) Foreign Application Priority Data

Aug. 30, 2000 (JP) ........................................ 2000-261128

(51) Int. Cl.[7] .......................... H04M 1/66; H04M 3/42; G06F 11/30
(52) U.S. Cl. ................ 379/196; 379/93.03; 379/142.05; 379/201.12; 713/200
(58) Field of Search ................................. 379/196–200, 379/201.01, 201.12, 207.13, 207.15, 210.02, 93.02, 93.03, 142.05, 201.04, 142.01; 713/200–202

(56) References Cited

U.S. PATENT DOCUMENTS 5,241,580 A * 8/1993 Babson, III .............. 379/10.03
5,737,400 A * 4/1998 Bagchi et al. ......... 379/142.01
5,748,723 A * 5/1998 Hanai et al. ........... 379/265.02
5,832,068 A * 11/1998 Smith .................... 379/114.14
5,901,284 A   5/1999 Hamdy-Swink ............ 713/200
6,009,082 A   12/1999 Caswell et al. ............. 370/276
6,026,156 A * 2/2000 Epler et al. ............ 379/215.01

* cited by examiner

Primary Examiner—Benny Tieu
(74) Attorney, Agent, or Firm—Oblon, Spivak, McClelland, Maier & Neustadt, P.C.

(57) ABSTRACT

A data communication system configured to promptly determine the validity of establishing the line connection between terminals and a host computer and maintaining the line connection. The data communication system includes at least a plurality of terminals and a sender telephone number detecting/informing device, which are interconnected by way of telephone lines including the public switched telephone network for use in the caller number identification and display service. By registering in the host computer ID codes for the terminals and telephone numbers corresponding to the respective ID codes, and by subsequently comparing the telephone number, which is currently detected and informed by sender telephone number detecting/informing means, with those registered previously, the line connection is established and the data communication is initiated with the terminal only when the telephone number is found among those registered.

26 Claims, 6 Drawing Sheets

SYSTEM AND METHOD FOR DATA COMMUNICATION

BACKGROUND OF THE INVENTION

1. Field of the Invention

This patent specification relates generally to a system and a method for data communication, and more specifically to such system and method incorporating a host computer and a plurality of terminals interconnected to each other by way of telephone lines including the public switched telephone network.

2. Discussion of the Invention

Data communication systems including a plurality of terminal units and a host computer are well known. The terminal units are remotely located and provided with communication capability, and are connected to the host computer by way of telecommunication networks, including public switched telephone networks.

When a request for a line connection is issued in the communication system from the remotely located terminal to the host computer, the validity of the line connection is determined by the host computer before initiating the data communication, in which the confirmation is generally carried out after establishing the connection via the line connection.

With this system structure, which includes a plurality of terminals and a host computer, a line connection is established between these terminals and the host computer only over the period when necessary, during which data communication is then carried out.

All of these line connections, however, are not always valid, since the terminals requesting line connections are not all necessarily uniform. As a result, there is a difficulty in the system, in that requests for line connections have to be met even for terminals for which the connection is not allowed (or invalid).

In addition, there is another difficulty in the system, in that some of the terminals are outside management parameters for the system, caused, for example, by a change in the working environment of the system on the part of the customer. This is exemplified by a change in phone number, alteration of the mode of telephone line (rotary dialing or pushbutton dialing), and incorporation of a private branch exchange (PBX), which are carried out in general independent of setting conditions of the data communication system.

Therefore, if a current setting is made such that data communication is performed using an already existing facsimile (FAX) line and only over the period other than when used for the FAX transmission, access for the data communication system may not be achieved. That is, the host computer is not able to reach the desired terminal to communicate, and this may be encountered when a change in the aforementioned environmental conditions for the system is made such as, for example, in the corporate organization (or system), in the configuration of the data communication system, in the wiring of communication lines, etc.

In such a case, the data communication system suffers from a drawback, in which there is no other way for the host computer to receive a call from that terminal. It becomes therefore unfeasible for the system to determine the reason why the terminal is non-accessible, in cases where the terminal is not presently operational, or is disconnected due to line displacement or removal, for example.

SUMMARY OF THE INVENTION

Accordingly, it is an object of the present invention to provide an improved novel data communication system, having the advantages and features of similarly employed systems and methods, while eliminating many of their disadvantages.

It is another object of the present invention to provide a novel data communication system including a host computer and a plurality of terminals interconnected to each other by way of telephone lines, for detecting a change in the working environment for the system, properly establishing the line connection between the terminals and the a host computer, and maintaining the line connection, even after a change in the working environment.

The following brief description is a synopsis of only selected features and attributes of the present invention. A more complete description thereof is found below in the section entitled "Description of the Preferred Embodiments."

A data communication system disclosed herein includes at least a plurality of terminals connected to a telephone line including the switched telephone network for use in the caller number identification and display service, sender number means for connecting with the switched telephone network, and for detecting and subsequently informing a sender telephone number informed by the telephone line, and a host computer for receiving the sender telephone number and connecting with the switched telephone network, and subsequently initiating the data communication with the plurality of terminals, in which the plurality of terminals each have own ID codes to distinguish one of the terminal from others, and the host computer in the data communication system includes registration means for registering the ID codes and sender telephone numbers corresponding to the ID codes, determination means for comparing the sender telephone number informed by the sender number detecting/informing means with the sender telephone numbers registered by the registration means, and for subsequently determining whether the sender telephone number is coincident with any of the sender telephone numbers registered, and communication control means for controlling data communication process steps through the sender telephone number detecting/informing means based on the result obtained by a comparison with the determination means.

The plurality of terminals may each include at least addition means for affixing additional numbers to the sender telephone to thereby form an instruction number that is utilized to instruct for the sender telephone number be made effective, and for subsequently sending the thus prepared number to the telephone line.

The addition means, in turn, may further include switch means for performing selective switching operations according to the determination whether the instruction number is affixed to the sender telephone number.

If it is determined by the determination means that the sender telephone number informed by the number detecting/informing means is non-coincident with any of the sender telephone numbers registered by the registration means, the host computer in the data communication system is configured to display a message indicating the above-mentioned result on a process input display unit.

In addition, if it is determined that the sender telephone number informed by the number detecting/informing means is non-coincident with any of the sender telephone numbers, a message indicating this determination result may also be displayed on a process input display unit. These messages may alternatively be printed out on a sheet of paper with a printer, relayed to an external system, or stored in storage means.

The host computer may further instruct the communication control means to attain a line connection through the sender telephone number detecting/informing means, and to subsequently initiate data communication with the plurality of terminals, if it is determined by the determination means that a sender telephone number informed by the sender number detecting/informing means is coincident with one of the sender telephone numbers registered by the registration means; and to reject the line connection by the sender telephone detecting/informing means, if it is determined that the sender telephone number is non-coincident with any of the sender telephone phone numbers registered by the registration means.

Further, the plurality of terminals may each transmit its own ID codes prior to data communication. In addition, the host computer, regardless the result of the determination by the determination means, may instruct the communication control means to attain the line connection, and to subsequently initiate the data communication with the terminal from which a request for data communication is made; and also may instruct the communication control means, if it is determined by the determination means that the sender telephone number informed by the sender number detecting/informing means is non-coincident with any of the sender telephone numbers registered by the registration means, to acquire an ID code transferred from the terminals, and to determine subsequently whether the ID code is coincident with any of the ID codes stored, to retain the line connection, if the ID code is found to be coincident with one of the ID codes stored, and to discontinue the line connection, if it is found the ID code is in non-coincident with any of the ID codes stored.

The host computer may additionally carry out either storing newly, if the ID code currently informed the sender telephone number detecting/informing means is determined to be coincident with one of the ID codes previously registered in the registration means, the sender telephone number informed by the sender telephone number detecting/informing means as the number corresponding to the ID code stored in the registration means; or storing the sender telephone number in the registration means, replacing the number previously stored.

Also, the host computer may further store an updated record on the sender telephone numbers informed by the sender telephone number detecting/informing means and the ID codes acquired from the plurality of terminals.

Methods for implementing the data communication process steps are also disclosed using the data communication system detailed in the present specification.

The present invention and features and advantages thereof will be more readily apparent from the following detailed description and appended claims when taken with drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description accompanied by several drawings, specific embodiments of the data communication system are detailed, which is particularly useful for implementing the data communication with proper interconnection between a host computer and terminal computers.

It is understood, however, that the present invention is not limited to these embodiments. For example, the use of the system and method disclosed herein may also be adaptable to any form of interconnection control by way of the communication network. Other embodiments will be apparent to those skilled in the art upon reading the following description.

Figure 1:
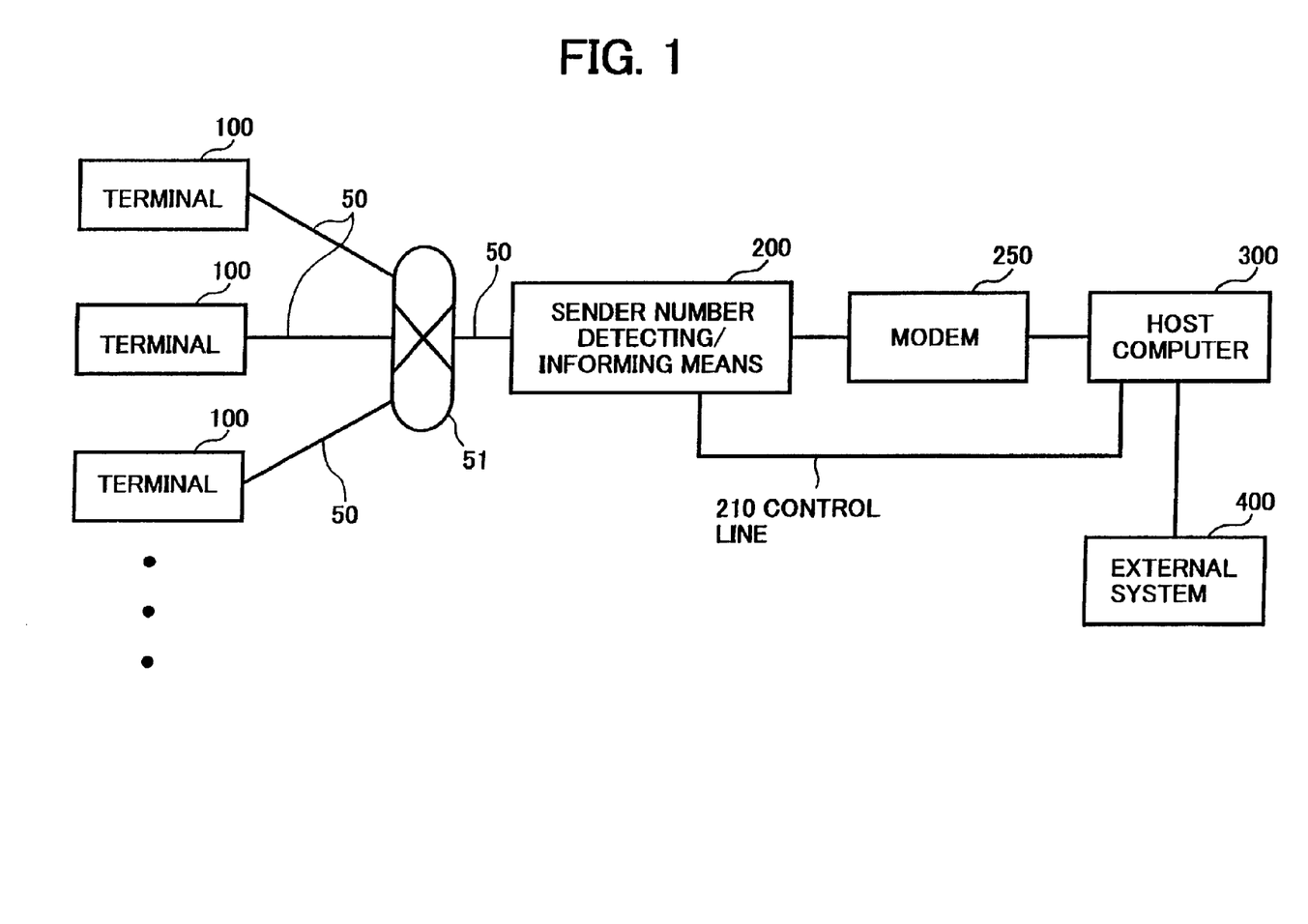
FIG. 1 is a block diagram illustrating the overall construction of the data communication system disclosed herein.

FIG. 1 is a block diagram illustrating the overall construction of the data communication system according to one embodiment disclosed herein.

Referring to FIG. 1, the data communication system includes at least a plurality of terminals 100 and sender number detecting/informing means 200, which are interconnected by way of telephone lines including a public switched telephone network for use in a caller number identification and display service, and the sender number detecting/informing means 200 is connected to a host computer 300 through a modulation and demodulation unit (modem) 250.

Further, the sender number detecting/informing means 200 and the host computer 300 are interconnected by a control line 210, and an external system 400 is also connected to the host computer 300 in the present embodiment.

The terminals 100 may be each regarded by the host computer 300 as located remotely and provided with communication capability.

Figure 2:
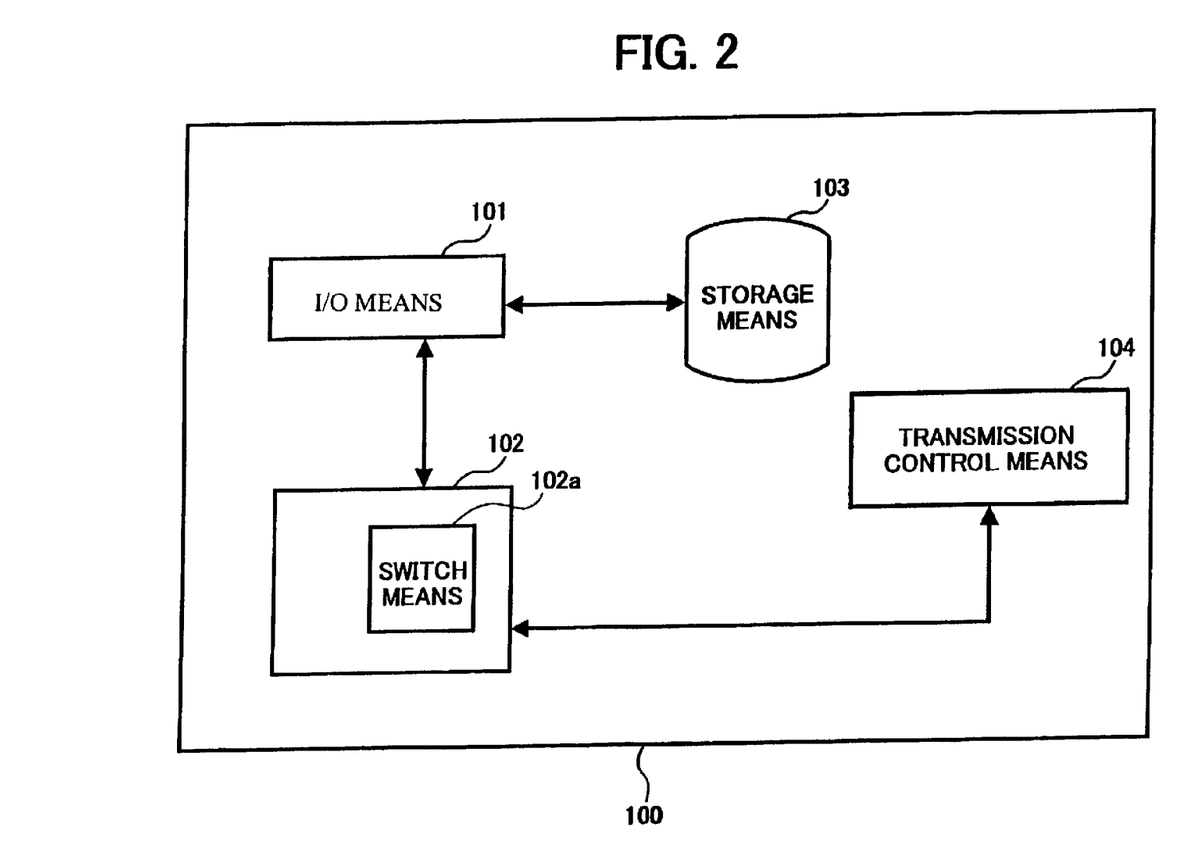
FIG. 2 is a more detailed block diagram of the terminal of FIG. 1.

As illustrated in FIG. 2, the terminal 100 includes at least input output (I/O) means 101 for carrying out input operations of data and output operations by displaying data, addition means 102, storage means 103 for storing ID codes and other data for use in distinguishing one terminal from the other; and transmission control means 104 for controlling the connection between the terminal 100 and telephone line 50, and the transmission of information between the terminal 100 and host computer 300.

The terminals 100 are each capable of exchanging information required for the system under the control of the data communication (or control system) shown in FIGS. 1 and 2.

Namely, by enabling the transmission control means 104, the necessary information can be subjected to various operations such as being input by the I/O means 101, transmitted to host computer 300 by way of the telephone line 50, received from host computer 300, displayed on a display unit of the I/O means 101, and stored in the storage means 103.

In addition, respective terminals 100 are able to exchange information and data with each other through read and write operations by means of a transmission with the host computer 300.

The addition means 102 is provided for instructing the transmission control means 104, according to input operations by the I/O means 101, to affix additional numbers to the telephone number presently used by the terminal 100 (hereinafter referred to as the sender number), thereby forming a number (or instruction number, hereinafter) which is utilized to instruct and make effective the sender number, and to send the thus prepared number to the telephone line 50.

In addition, the addition means 102 is further provided with switch means 102a for performing selective switching operations according to the determination whether the instruction number is affixed to the sender number.

Referring again to FIG. 1, the sender number detecting/informing means (or detecting/informing means, hereinafter) 200 is configured to first detect a terminal 100 from which a request for communication is issued via the telephone line 50, find its sender number and subsequently inform the host computer 300 of this sender number.

Also, the detecting/informing means 200 takes control of the connection and disconnection between the telephone line 50 and the host computer 300, in which the host computer 300 is informed of the received information after demodulation by the modem 250, which are sent from and modulated by the modem 250, and further sent to telephone line 50.

The aforementioned caller number identification and display service is offered to subscribers by proprietors of telecommunication businesses utilizing communication lines by either providing their own telephone lines incorporating the public switched telephone network or having lines on loan. Also in this service, the identified caller and caller ID are informed by appropriately displaying them on the receiver's side, only when a call is received from a telephone line for which informing the number is effectively set in advance.

The modem 250 is for data communication using the telephone lines 50, which is provided between the sender number detecting/informing means 200 and the host computer 300, to perform modulation and demodulation to properly implement communication.

Figure 3:
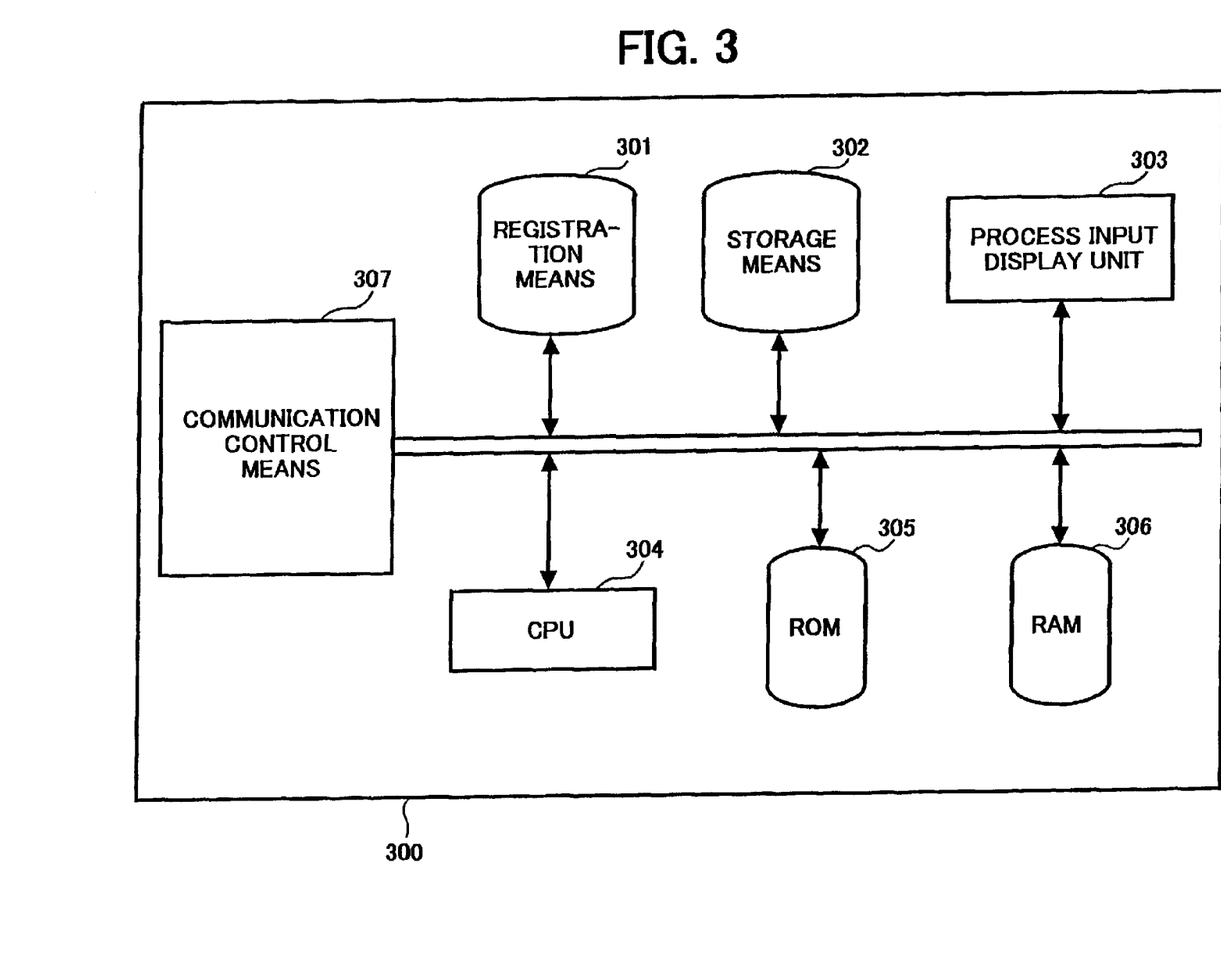
FIG. 3 is a more detailed block diagram of the host computer of FIG. 1.

As illustrated in FIG. 3, the host computer 300 includes at least a registration means 301, storage means 302, process input display unit 303, CPU 304, ROM 305, RAM 306, and communication control means 307. In addition, there is also included a printer (not shown) as a printing means.

The registration means 301 is configured to register identification codes of all terminals 100, for which communication with the host computer 300 is each expected, together with sender numbers each corresponding to the terminals 100. The registration is then carried out by storing in the storage means 302.

When one terminal 100 is connectable to plural lines (or when an extension is possibly connected to plural external lines), a number of plural lines are registered under a single identification code for the terminal 100.

The storage means 302 includes at least a storage unit such as a hard disk, and is configured to store various information including permanent data necessary for processing sender numbers, data generated during the processing steps, information for use in controlling the terminal 100 and various user data, in addition to the aforementioned identification code with plural corresponding numbers.

The process input display unit 304 includes an input portion for information to be input by an operator, and a display portion for use in displaying the information. The input portion is configured to input by a key board and mouse, for example, various information such as the data to be registered into the registration means 301, the information for use by the CPU 304 in executing application programs such as for document forming and editing, other document processing, and the information necessary for operating the registration means 301.

The display portion features an LCD display panel, for example, and is configured to display information such as data which are input by input operations through the input portion, the current working status of the host computer 300, and guidance information useful in input operations.

The CPU 304 is a central processing unit to take overall control of the host computer 300, which includes a ROM 305 and a RAM 306 to form a microcomputer. The CPU 304 is thus able to perform several operations disclosed herein according to the programs stored in the ROM 305.

The ROM 305 is a program memory for storing the programs executed by the CPU 304 and permanent data. The RAM 306 is configured to store several data including those utilized by the CPU 304 to properly execute operations, and temporary data obtained during processing operations, among others.

The communication control means 307 is configured to control data communication steps which are performed between the host computer 300 and the sender number detecting/informing means 200 according to the communication protocol.

Namely, upon receiving instructions from the CPU 304, the communication control means 307 takes control of the line connection steps with the telephone lines 50 through the sender number detecting/informing means 200 and the modem 250 so as to achieve the proper connection between the host computer 300 and the terminals 100.

After describing the system and the operation thereof above, process steps for data communication with the system will now be detailed according to specific embodiments.

Referring to FIG. 1, assume first it is necessary for one of the terminals 100 to communicate with the host computer 300.

Upon being enabled by an input operation from the I/O means 101, the terminal 100 instructs for the addition means 102 to send an instruction to the transmission control means 104, regardless whether the currently connected telephone line 50 is capable of offering the caller number identification and display service.

The transmission control means 104 then sends to the telephone line 50 a sender number affixed with the aforementioned instruction number in front (hereinafter referred to as affixed sender number), and at the same time issues a call to the host computer 300 by way of the public switched telephone network 51.

Upon sending out the affixed sender number out to the telephone line 50, the switched telephone network 51 relays the sender number to the sender number detecting/informing means 200. After receiving and then detecting the number, the detecting/informing means 200 informs to the host computer 300 by way of the control line 210.

Upon receiving the number by means of the communication control means 307 shown in FIG. 3, the host computer 300 is configured to send the number to the CPU 304. The CPU 304 subsequently executes the processing steps shown in FIG. 4, which follows. It is noted that the number of each step is headed by "S" for abbreviation in the following flow charts.

Figure 4:
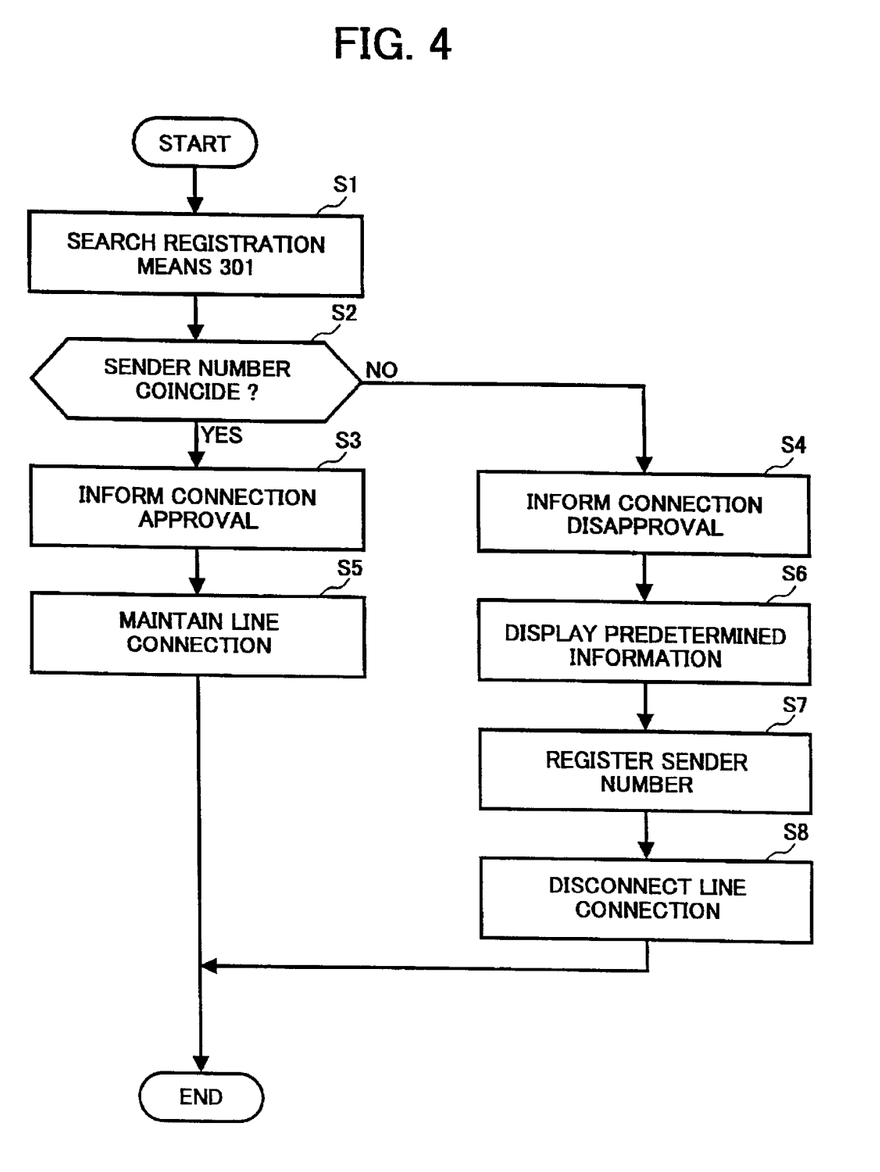
FIG. 4 includes a flow chart illustrating a process flow for the data communication system according to one embodiment disclosed herein.

The process begins in step 1 where phone numbers registered in the registration means 301 are first searched. After completing the Step 1, the process proceeds to Step 2, where a program is executed to determine whether the currently informed number is coincident with any of previously stored numbers, i.e., whether the present phone number has been registered.

If the above coincidence is found, i.e., Yes in step 3, the process proceeds to Step 3, where the communication control means 307 is instructed to issue and then send an approval for the line connection to the sender number detecting/informing means 200.

In contrast, if no coincidence is found, i.e., No in Step 3, the process proceeds to Step 4, where the communication control means 307 is instructed to issue and send a disapproval of the line connection to the sender number detecting/informing means 200, since the presently sent ID code indicates that the request is not from any of the terminals registered already.

When the line connection is approved in Step 3, the sender number detecting/informing means 200 operates to connect the host computer 300 to telephone line 50, and then the process proceeds to Step 5, where the communication control means 307 instructs the sender number detecting/informing means 200 to retain the line connection.

After completing Step 4, the process proceeds to Step 6, where a predetermined message is displayed on the process input display unit 303, indicating that the current sender number has not been registered (e.g., the current sender number and a message of not being registered appears on the display).

Alternatively, this process may also be carried out by sending the predetermined information to an external system 400 by communication control means 307, printing out on a sheet of paper with a printer (not shown), or storing in the storage means 302.

Further in Step 7, the non-registered number is newly registered. After completing Step 7, the process proceeds to Step 8, where the communication control means 307 instructs the sender number detecting/informing means 200 to reject connecting operations and to discontinue subsequent connections.

In the present case, therefore, the host computer 300 subsequently does not operate to receive an ID number from the terminal which requests the line connection, does not determine whether a received number has been registered, and does not perform data communication with the number.

As described above, after receiving the requests for line connection from a terminal 100, the host computer 300 is configured to perform determination steps on whether the current sender number is coincident with any of previously stored numbers, in response to the search carried out based on the sender number which is informed by sender number detecting/informing means 200. The line connection is thus established only after it has been properly determined whether the present sender is included among regular terminals.

For identifying valid sender numbers in the data communication system, the following methods are generally known: (1) confirming the receipt of the phone, (2) identifying the log-in or password during the validation process, and (3) executing an appropriate application program.

The above method (1) by confirming the receipt, therefore, makes the determination rather quickly at relatively low level, to thereby disapprove or reject the line connection in a timely manner.

In addition, since it is already determined whether the current number from the terminal 100 has been stored based on the informed number, connection as one of the regular terminal becomes feasible, even when the phone number currently in use has changed, so long as the thus changed number is registered along with the registered ID code of the terminal. The line connection between the terminal 100 and the host computer 300 can therefore be maintained.

In addition, as described earlier in Step 6 of FIG. 4, the predetermined message is displayed on the process input display unit 303, indicating that the current sender number has not been registered.

Since the non-registered conditions are therefore displayed on the display portion when the current sender number, from which the line connection is requested to the host computer 300, the following remedial steps can be carried out with relative ease with reference to the displayed information.

For example, if the terminal with the current request for a regular line connection, the non-registered sender number may now be registered by input operations on the process input display unit 303. Also, the thus currently informed and non-registered numbers are automatically stored in Step 7, thereby facilitating steps regarding terminals with future line connection requests.

In addition, it is noted that any one, or both, of the Steps 6 and 7 may be abbreviated, if necessary.

Further, when another sender number for the terminal is found non-registered, from which a succeeding line connection is requested, the host computer 300 is configured to discontinue the line connection without identifying the ID number from the terminal. Therefore, the line accesses from illegal terminals can be prevented for certain.

The addition means 102 (FIG. 2) included in the terminal 100 is further provided with the switch means 102a for performing selective switching operations that are carried out according to the determination whether the instruction number is affixed to the sender number.

Therefore, selective switching operations become feasible, to thereby enable selection at will of the instruction numbers that are to be affixed to the sender number, when the call for the request is issued from the terminal 100, as described earlier.

The telephone line 50 is in general used not only by telephones alone but shared with facsimile apparatuses, for example. In addition, the aforementioned caller number identification and display service may not always available to the telephone.

In such a case, and especially when the line 50 is owned by someone else, the availability of the service through the line 50 depends on the owner of the line. As a result, the above-noted service is again not always available.

With the switch means 102a provided as above, however, improvement can be provided in the line connection, in which the ordinary communications including the facsimile transmission, for example, are made without affixing the instruction numbers, while other communications are carried out with the numbers affixed. And, this is feasible by properly switching the switch means 102a, as indicated earlier.

In this manner, the sender number identification/display can be limited to the communications disclosed in the present embodiments, while not being performed for other communications. As a result, disadvantages caused by constant sender number identification/display can be alleviated.

In addition, in the case where some of the lines within the interconnected terminals 100 are not using the caller number identification and display service, the communication from those lines may also be treated as ordinary lines, which are utilizing the service, by providing the switch means 102a in terminals 100. Therefore, the overall line connection can be maintained.

On the other hand, the registration means 301 is configured to register a plurality of telephone numbers (sender numbers) for a single ID code. When a terminal 100 issues a request under any one number among these requested, therefore, the request can be accepted as an ordinary one and the line connection can be made, since the plurality of phone numbers are registered in advance.

For example, the case of a relatively large number of local telephones provided in-house incorporating the public branch exchange (PBX) is considered. In such a case, the telephones are each configured to communicate with any one of outside lines via the PBX by establishing the connection thereto and may each further be provided with terminal(s).

In addition, when a line connection request to the host computer 300 is issued from the terminals 100 connected to the local line, one of idle lines may be assigned to the connection. This makes its phone number possibly indefinite and fluctuating.

This difficulty can be alleviated by host computer 300 by registering all possible phone numbers corresponding to ID codes for the terminals 100. As a result, the request from any of the lines can be identified as ordinary and the line connection can be made without difficulty.

Detailed above is the case where a sender number is not registered for a terminal from which a succeeding line connection is requested. No line connection is established accordingly, and the host computer 300 is configured to reject the communication.

Next, a further case will be detailed with reference to the flow chart included in FIG. 5, where the line connection is established and the communication with a terminal 100 is allowed, even when the number for the terminal has not been registered. It is noted that the number of each step is headed by "S" for abbreviation in this flow chart, as well.

Figure 5A:
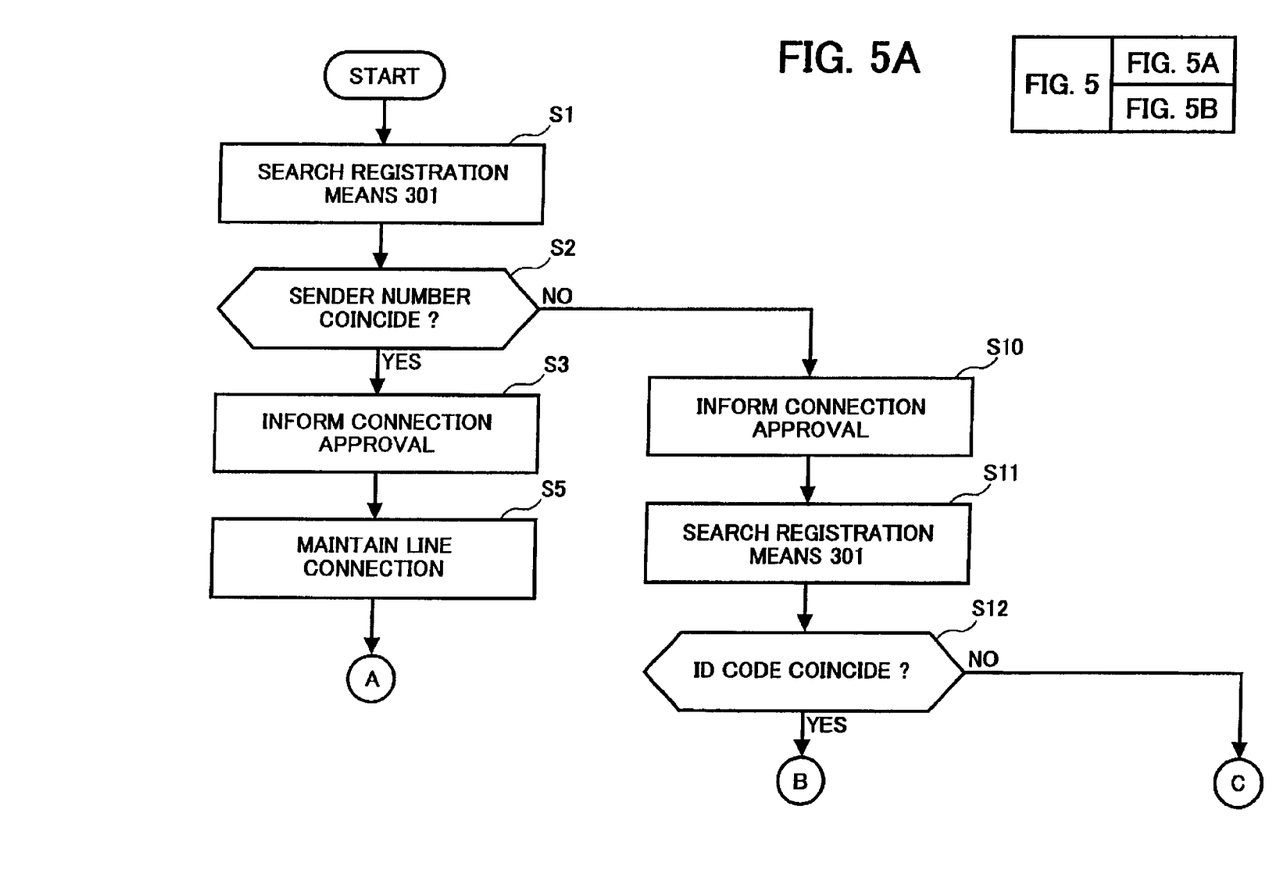
FIG. 5 includes a flow chart illustrating a process flow for the data communication system according to another embodiment disclosed herein.
Figure 5B:
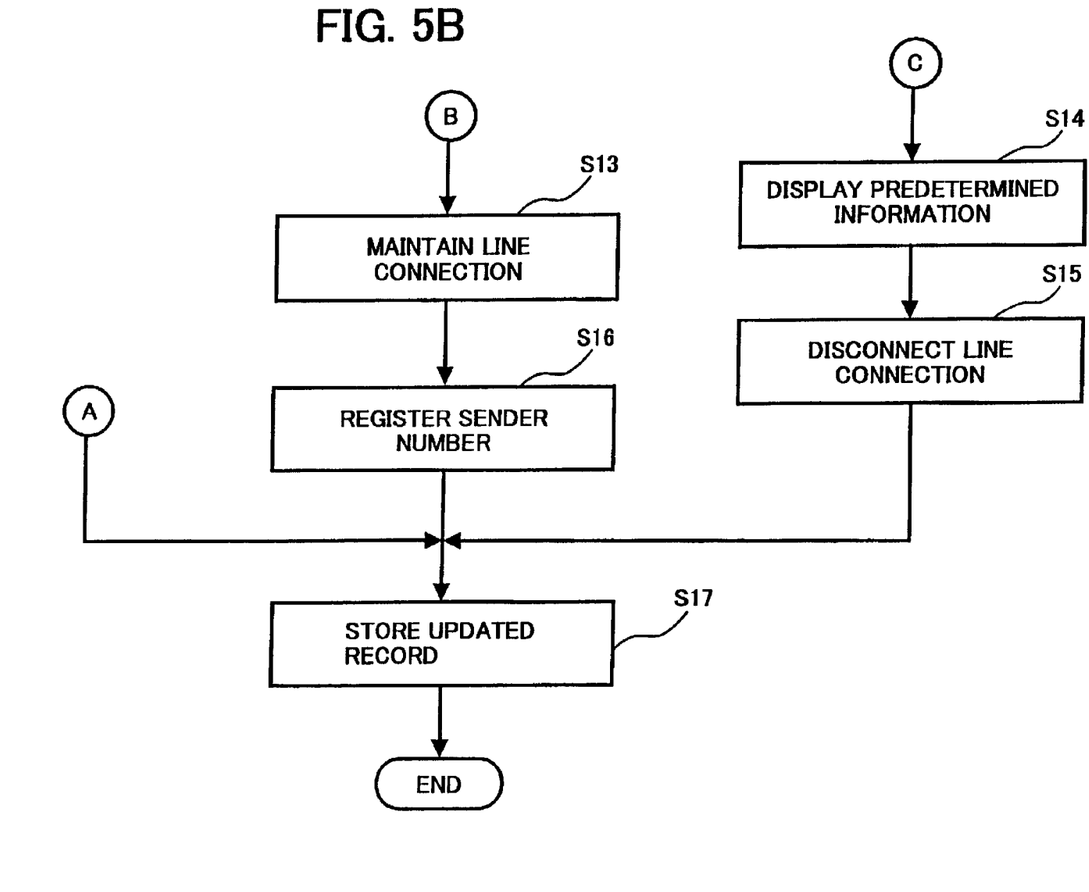

In a similar manner to the aforementioned process of FIG. 4, the host computer 300 of FIG. 3 is configured to initiate process steps included in FIG. 5 upon receiving a sender number from the communication control means 307.

The process begins in step 1 where phone numbers registered in the registration means 301 are first searched. After completing the Step 1, the process proceeds to Step 2, where a program is executed to determine whether the currently informed number is coincident with any of previously stored numbers.

If the above coincidence is found, i.e., Yes in Step 2, the process proceeds to Step 3, while it proceeds to Step 10, if no coincidence is found. In either case, the communication control means 307 then instructs to issue and send an approval for the line connection to the sender number detecting/informing means 200. This detecting/informing means 200 then operates to connect the host computer 300 to telephone line 50.

After completing Step 3, the process proceeds to Step 5, where the communication control means 307 instructs the sender number detecting/informing means 200 to retain the line connection and to perform the data communication.

The process then proceeds to Step 17, where an updated record of the information on the sender numbers is stored in the storage means 302, and the process ends.

After completing Step 10, on the other hand, the process proceeds to Step 11, where a program is executed to communicate with a terminal 100, acquire its ID code, and search ID codes previously registered in the registration means 301. Subsequently in Step 12 it is determined whether the currently acquired ID code is coincident with any of those previously stored.

If the above coincidence is found, i.e., No in Step 2, the process proceeds to Step 13, where the communication control means 307 instructs the sender number detecting/informing means 200 to retain the line connection and to perform the data communication with the terminal 100 from which the request is issued.

The process then proceeds to Step 16, where one of the following registration processes is carried out. Namely, the processes are (1) newly storing the sender number, which is currently informed by the sender number detecting/informing means 200 and adapted as the number corresponding to the ID code that is determined in Step 12 to be coincident with one of those previously stored, i.e., Yes in Step 12, in the registration means 301, and (2) storing the sender number, which is currently informed by the sender number detecting/informing 200 as above, replacing the phone number previously stored.

After completing Step 16, the process proceeds to Step 17, where an updated record of the information on the sender numbers and ID codes is stored in the storage means 302, and the process ends.

On the other hand, if the currently acquired ID code is found in Step 12 to be not coincident with any of those previously stored, i.e., No in step 12, the process proceeds to Step 14, where a predetermined display is presented on the screen of the process input display unit 303.

Alternatively, this process may also be carried out by sending predetermined information to an external system 400 by the communication control means 307, printing out on a sheet of paper with a printer (not shown), or storing in the storage means 302.

The process then proceeds to Step 15, where the communication control means 307 instructs the sender number detecting/informing means 200 to discontinue the connection and not to perform the data communication.

The process then proceeds to Step 17, where an updated record of the information on the non-registered ID codes and sender numbers is stored in the storage means 302, and then the process ends.

As described herein above, remedial measures can be taken in the present embodiment, in the case where the sender number for the terminal has not been registered for the terminal 100 from which the request for the line connection is issued. This is carried out after establishing the line connection prior to the data communication with the above noted capability of acquiring the ID code for the terminal, then determining whether the code is already registered. As a result, the line connection can be retained as long as the ID code for the terminal is registered, even when its sender number has not been registered.

Since the data communication is therefore initiated after determining whether the ID code is registered, the data communication is carried out only with regular terminals and line accesses from illegal terminals can be prevented.

In addition, since the non-registered sender numbers are newly registered as the number corresponding to the ID code, which is previously determined in Step 12 as coincident with one of those previously stored, and since this is regarded as though the numbers informed by the sender number detecting/informing means 200 are currently registered in the host computer 300, effective measures such as continuing line connection and initiating the data communication can be taken even without confirmation steps for the ID code, when a succeeding request for the line connection from the same number is issued.

Further, when neither the sender numbers informed by the sender number detecting/informing means 200 nor the ID codes acquired after establishing the line connection are registered, this information or the present status is informed in Step 14, by either being presented as a predetermined display on the process input display unit 303, or output on a sheet of paper with a printer.

As a result, possible succeeding measures such as, for example, the later confirmation of the terminals, becomes feasible more easily.

In addition, by storing updated record of the information on the non-registered ID codes and sender numbers (for both cases of coincidence and non-coincidence) as carried out in Step 17, the presentation of succeeding information becomes feasible, which is carried out by either reading out from the storage means 302 and displaying on the screen of the process input display unit 303, or printing out on a sheet of paper with a printer.

As a result, possible succeeding operations can be carried out with more ease such as, for example, the later confirmation of the change in phone number and non-registered terminal from which the request of line connection is issued.

A request for a line connection issued from the host computer 300 also becomes feasible. Further, the change in the environment for the communication system operation can be comprehended with more ease over the entire data communication system. Still further, in case of any trouble in the system, prompt remedial actions can be taken by analyzing the updated record stored in the storage means 302.

The systems and process steps set forth in the present description may therefore be implemented using the host computer and terminals disclosed herein incorporating appropriate processors programmed according to the teachings disclosed herein, as will be appreciated to those skilled in the relevant arts.

Therefore, the present invention also includes a computer-based product which may be hosted on a storage medium and include instructions which can be used to program a processor to perform a process in accordance with the present invention. The storage medium can include, but is not limited to, any type of disk including floppy disks, optical disks, CD-ROMS, magneto-optical disks, ROMs, RAMs, EPROMs, EEPROMS, flash memory, magnetic or optical cards, or any type of media suitable for storing electronic instructions.

It is apparent from the above description including the examples, since the data communication system disclosed herein is configured to determine whether the present number which is requesting the line connection is included among regular terminals, and then to establish the line connection, it is feasible to achieve the determination promptly at an early stage of operation steps, to thereby be able to reject the line connection when the present terminal can not be confirmed to be regular.

When the sender number for the terminal has not been registered, as found out after establishing the line connection, the line connection is maintained and data communication is also initiated, as long as its ID code is registered. As a result, the data communication can be carried out even for terminals whose phone numbers have been altered.

In addition, by registering the thus altered numbers corresponding to respective ID codes, the line connection can be attained even after possible change in the environment for the communication system operation such as, for example, telephone number, and the line connection between the terminals and the host computer can therefore be maintained.

Additional modifications and variations of the present invention are possible in light of the above teachings. It is therefore to be understood that within the scope of the appended claims, the invention may be practiced other than as specifically described herein.

This document claims priority and contains subject matter related to Japanese Patent Application No. 2000-261128, filed with the Japanese Patent Office on Aug. 30, 2000, the entire contents of which are hereby incorporated herein by reference.

What is claimed is:

1. A data communication system comprising:
   a plurality of terminals connected to a telephone line including a switched telephone network for use in a caller number identification and display service;
   sender number detecting/informing means for connecting with said switched telephone network, and for detecting and subsequently informing a sender telephone number informed by said telephone line; and
   a host computer for receiving said sender telephone number and connecting with said switched telephone network, and subsequently initiating a data communication with said plurality of terminals,
   wherein said plurality of terminals each have their own ID codes to distinguish one of said terminal from others, and
   wherein said host computer comprises
   registration means for registering said ID codes and sender telephone numbers corresponding to said ID codes;
   determination means for comparing said sender telephone number informed by said sender number detecting/informing means with said sender telephone numbers registered by said registration means, and for subsequently determining whether said sender telephone number is coincident with any of said registered sender telephone numbers; and
   communication control means for controlling data communication process steps through said sender telephone number detecting/informing means based on a result obtained by a comparison with said determination means.

2. The data communication system according to claim 1, wherein said plurality of terminals each include at least addition means for affixing additional numbers to said sender telephone number to thereby form an instruction number that is utilized to instruct and make effective said sender telephone number, and for sending subsequently thus prepared number to said telephone line.

3. The data communication system according to claim 2, wherein said addition means includes switch means for performing selective switching operations according to a determination whether said instruction number is affixed to said sender telephone number.

4. The data communication system according to claim 1, wherein said host computer includes means for implementing, if it is determined by said determination means that a sender telephone number informed by said sender number detecting/informing means is non-coincident with any of said sender telephone numbers registered by said registration means, at least one of:

displaying a message on a process input display unit, printing out said message on a sheet of paper with a printer, sending said message to an external system, and storing said message in storage means, said message indicating that said sender telephone number informed by said sender number detecting/informing means is found non-coincident with any of said sender telephone numbers registered by said registration means.

5. The data communication system according to claim 1, wherein said host computer further includes:

means for instructing said communication control means;

means for attaining a line connection through said sender telephone number detecting/informing means, and subsequently initiating data communication with said plurality of terminals, if it is found by said determination means that a sender telephone number informed by said sender number detecting/informing means is coincident with one of said sender telephone numbers registered by said registration means; and means for rejecting said line connection by said sender telephone detecting/informing means, if it is determined by said determination means that a sender telephone number informed by said sender number detecting/informing means is non-coincident with any of said sender telephone phone numbers registered by said registration means.

6. The data communication system according to claim 1, wherein said registration means in said host computer registers a plurality of sender telephone numbers corresponding to a single ID code.

7. The data communication system according to claim 1, wherein said determination means further determines that a request for line connection is from one of said terminals, for which said sender telephone number is already registered, if it is determined that a sender telephone number informed by said sender number detecting/informing means is coincident with any of said sender telephone numbers corresponding to said ID codes registered by said registration means.

8. The data communication system according to claim 1, wherein said plurality of terminals each include means for transmitting said own ID codes prior to data communication, and wherein said host computer further includes means for instructing said communication control means, regardless a result of a determination by said determination means;

means for attaining a line connection, and for initiating subsequently a data communication with a terminal from which a request for said data communication is made; and means for instructing said communication control means, if it is determined by said determination means that said sender telephone number informed by said sender number detecting/informing means is non-coincident with any of said sender telephone numbers registered by said registration means, to acquire an ID code transferred from said terminals, and to subsequently determine whether said ID code is coincident with any of said ID codes stored; to retain said line connection, if it is found said ID code is coincident with one of said ID codes stored; and to discontine said line connection, if it is found said ID code is in non-coincident with any of said ID codes stored.

9. The data communication system according to claim 8, wherein said host computer further includes means for implementing, if it is determined by said determination means that said ID code informed by said sender telephone number detecting/informing means is non-coincident with any of said ID codes registered by said registration means, at least one of displaying a message on a process input display unit, printing out said message on a sheet of paper with a printer, sending said message to an external system, and storing said message in storage means, said message indicating that an ID code informed by said sender telephone number detecting/informing means is found non-coincident with any of said ID codes registered by said registration means.

10. The data communication system according to claim 8, wherein said host computer further includes means for implementing at least one of storing newly, if an ID code currently notified by said sender telephone number detecting/informing means is determined to be coincident with one of said ID codes previously registered in said registration means, a sender telephone number informed by said sender telephone number detecting/informing means as a number corresponding to said ID code in said registration means; and storing said sender telephone number in said registration means, replacing said number previously stored.

11. The data communication system according to claim 8, wherein said registration means in said host computer registers a plurality of sender telephone numbers corresponding to a single ID code.

12. The data communication system according to claim 11, wherein said determination means further determines that a request for line connection is from one of said terminals, for which said sender telephone number is already registered, if it is determined that a sender telephone number informed by said sender number detecting/informing means is coincident with any of said sender telephone numbers corresponding to said ID codes registered by said registration means.

13. The data communication system according to claim 8, wherein said host computer further includes means for storing an updated record on said sender telephone numbers informed by said sender telephone number detecting/informing means and said ID codes acquired from said plurality of terminals.

14. A method for implementing data communication by means of a data communication system including at least a plurality of terminals connected to a telephone line including a switched telephone network for use in a caller number identification and display service, a sender number detecting/informing means for connecting with said switched telephone network, and for detecting and subsequently informing a sender telephone number informed by said telephone line, and a host computer for receiving said sender telephone number and connecting with said switched telephone network, and subsequently initiating a data communication with said plurality of terminals, said plurality of terminals each having own ID codes, comprising the steps of:

registering said ID codes and sender telephone numbers corresponding to said ID codes;

comparing said sender telephone number informed by said sender number detecting/informing means with said sender telephone numbers registered by said registration means, and for subsequently determining whether said sender telephone number is coincident with any of said registered sender telephone numbers registered; and controlling data communication process steps through said sender telephone number detecting/informing means based on a result obtained by a comparison with said determination means.

15. The method according to claim 14, further comprising the steps of:

affixing additional numbers to said sender telephone number to thereby form an instruction number that is utilized to instruct and make effective said sender telephone number; and sending a thus prepared number to said telephone line.

16. The method according to claim 15, further comprising the step of:

performing selective switching operations according to a determination whether said instruction number is affixed to said sender telephone number.

17. The method according to claim 14, further comprising the steps of:

implementing, if it is determined by said determination means that a sender telephone number informed by said sender number detecting/informing means is non-coincident with any of said sender telephone numbers registered by said registration means, at least one of displaying a message on a process input display unit;

printing out said message on a sheet of paper with a printer;

sending said message to an external system; and storing said storage in storage means, said message indicating that said sender telephone number informed by said sender number detecting/informing means is found non-coincident with any of said sender telephone numbers registered by said registration means.

18. The method according to claim 14, further comprising the step of:

instructing said communication control means to attain a line connection through said sender telephone number detecting/informing means, and subsequently initiating data communication with said plurality of terminals, if it is found by said determination means that a sender telephone number informed by said sender number detecting/informing means is coincident with one of said sender telephone numbers registered by said registration means; and rejecting said line connection by said sender telephone detecting/informing means, if it is determined by said determination means that a sender telephone number informed by said sender number detecting/informing means is non-coincident with any of said sender telephone phone numbers registered by said registration means.

19. The method according to claim 14, wherein said step of registering is carried out for said plurality of sender telephone numbers corresponding to a single ID code.

20. The method according to claim 14, wherein said step of determining determines that a request for line connection is from one of said terminals, for which said sender telephone number is already registered, if it is determined that a sender telephone number informed by said sender number detecting/informing means is coincident with any of said sender telephone numbers corresponding to said ID codes registered by said registration means.

21. The method according to claim 14, further comprising the steps of:

transmitting said own ID codes prior to data communication for said plurality of terminals, wherein said host computer includes means for instructing said communication control means, regardless of a result of a determination by said determination means, attaining a line connection, and initiating subsequently a data communication with a terminal from which a request for said data communication is made, instructing said communication means, if it is determined by said determination means that said sender telephone number informed by said sender number detecting/informing means is non-coincident with any of said sender telephone numbers registered by said registration means, acquiring an ID code transferred from said terminals, and subsequently determining whether said ID code is coincident with any of said ID codes stored;

retaining said line connection, if it is found said ID code is coincident with one of said ID codes stored; and discontinuing said line connection, if it is found said ID code is in non-coincident with any of said ID codes stored.

22. The method according to claim 21, further comprising the step of:

implementing, if it is determined by said determination means that said ID code informed by said sender telephone number detecting/informing means is non-coincident with any of said ID codes registered by said registration means, at least one of displaying a message on a process input display unit;

printing out said message on a sheet of paper with a printer;

sending said message to an external system; and storing said message in storage means, said message indicating that an ID code informed by said sender telephone number detecting/informing means is found non-coincident with any of said ID codes registered by said registration means.

23. The method according to claim 21, further comprising the step of:

implementing, if an ID code currently notified by said sender telephone number detecting/informing means is determined to be coincident with one of said ID codes previously registered in said registration means, at least one of storing newly a sender telephone number informed by said sender telephone number detecting/informing means as a number corresponding to said ID code in said registration means; and storing said sender telephone number in said registration means, replacing said number previously stored.

24. The method according to claim 21, wherein said step of registering for said registering means is carried out for said plurality of sender telephone numbers corresponding to a single ID code.

25. The method according to claim 24, wherein said step of determining determines that a request for line connection is from one of said terminals, for which said sender telephone number is already registered, if it is determined that a sender telephone number informed by said sender number detecting/informing means is coincident with any of said sender telephone numbers corresponding to said ID codes registered by said registration means.

26. The method according to claim 21, further comprising the step of:

storing an updated record on said sender telephone numbers informed by said sender telephone number detecting/informing means and said ID codes acquired from said plurality of terminals.

* * * * *